US011677891B1

(12) United States Patent
Li et al.

(10) Patent No.: US 11,677,891 B1
(45) Date of Patent: Jun. 13, 2023

(54) IMAGE PATH THAT SUPPORTS DEVICE BASED INFRARED MARK IMAGING

(71) Applicant: Xerox Corporation, Norwalk, CT (US)

(72) Inventors: Xing Li, Webster, NY (US); Yongyi Ye, Penfield, NY (US); Richard James Eddy, Jr., Webster, NY (US); William L. Yeoh, Rochester, NY (US); Clara Cuciurean-Zapan, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/665,410

(22) Filed: Feb. 4, 2022

(51) Int. Cl.

| | |
|---|---|
| ***H04N 1/32*** | (2006.01) |
| ***G06T 7/70*** | (2017.01) |
| ***G06T 1/00*** | (2006.01) |

(52) U.S. Cl.
CPC ....... *H04N 1/32149* (2013.01); *G06T 1/0021* (2013.01); *G06T 7/70* (2017.01); *G06T 2201/0065* (2013.01)

(58) Field of Classification Search
CPC ..... H04N 1/32149; G06T 1/0021; G06T 7/70; G06T 2201/0065
See application file for complete search history.

(56) References Cited

U.S. PATENT DOCUMENTS

| | | | | |
|---|---|---|---|---|
| 8,064,102 | B1 * | 11/2011 | Zhao | B42D 25/333 358/1.9 |
| 8,130,389 | B2 | 3/2012 | Li et al. | |
| 9,736,333 | B1 | 8/2017 | Li et al. | |
| 10,341,671 | B2 | 6/2019 | Gopalakrishnan et al. | |
| 2007/0165259 | A1 | 7/2007 | Amorim | |
| 2008/0019559 | A1 * | 1/2008 | Wang | H04N 1/32229 382/100 |
| 2008/0302263 | A1 * | 12/2008 | Eschbach | H04N 1/32149 356/51 |
| 2009/0262400 | A1 | 10/2009 | Eschbach et al. | |
| 2014/0085392 | A1 | 3/2014 | Chapman et al. | |

OTHER PUBLICATIONS

"Fraud-Resistant Effects That Protect Your Most Sensitive Documents", Specialty Imaging, Xerox 2019.

* cited by examiner

*Primary Examiner* — Christopher Wait
(74) *Attorney, Agent, or Firm* — Ortiz & Lopez, PLLC; Kermit D. Lopez; Luis M. Ortiz

(57) ABSTRACT

In an embodiment, a method of rendering an infrared mark, can involve providing an image path for an image processing apparatus, wherein the image path integrates infrared mark related functions with regular image processing functions of the image processing apparatus, and rendering the infrared red mark with the image processing apparatus, after subjecting the infrared mark to the infrared mark related functions in the image path of the image processing apparatus.

20 Claims, 3 Drawing Sheets

IMAGE PATH THAT SUPPORTS DEVICE BASED INFRARED MARK IMAGING

TECHNICAL FIELD

Embodiments are related to image processing methods, systems and devices. Embodiments also relate to printing devices and techniques. Embodiments further relate to security features such as watermarks including infrared marks. Embodiments are further related to specialty imaging.

BACKGROUND

In conventional printing processes that may require security measures, a pattern color space having specialty imaging characteristics can be used to facilitate security measures and prevent counterfeiting of printed materials. Furthermore, in conventional printing processes, a pattern color space can be used, in part on variable data, such as printing logos, serial numbers, seat locations, or other types of unique identifying information on printed materials.

Security is an important requirement in many document production applications. In situations such as official or government document printing, event ticket printing, financial instrument printing and the like, many documents must be protected against copying, forging and/or counterfeiting. To accomplish this, printed documents often include security marks or security features that serve to prevent counterfeiting and/or identify a document as original.

Thus, in security applications, it may be desirable to add information to a document in the form of a security mark or a security feature that may prevent or hinder alterations and counterfeiting. Specialty imaging has been used, conventionally, in printed materials to provide fraud protection and anti-counterfeiting measures for such security applications. Some examples are in prescriptions, contracts, documents, coupons, and tickets. Typically, several specialty-imaging techniques are used at various positions in a document. In addition, these security elements may in some cases conflict with the overall aesthetics of the document.

Examples of specialty imaging include, but are not limited to, features such as the Xerox® MicroText Mark, Xerox® Correlation Mark, Xerox® GlossMark®, Xerox® Infrared Mark and Xerox® Fluorescent Mark, which add security to static and variable information (VI) jobs by making it difficult to counterfeit them. Using multiple effects—including visible ones—on an application makes reproducing it more costly than purchasing the original. Specialty imaging can also be used to add visual interest and sophistication to print jobs. Specialty imaging may also be used to add reflective text to enhance photos, illustrations and colored backgrounds.

In the area of security printing, documents can be protected from copying, forging and counterfeiting using multiple techniques. Specialty imaging is one such method for security printing, which can use standard material such as papers, inks and toners. Typically, security printing companies in the marketplace require special (expensive) materials. An example document is a prescription where a pharmacist would like to be able to have a good level of confidence that the document is genuine.

One technique for specialty imaging involves the use of infrared (IR) text/graphics where a hidden message may only be seen under IR illumination with, for example, an IR camera. The IR text/graphics can be implemented as an IR mark in some specialty image technologies. Currently, IR marks are available only for print jobs in production products and selected office products, thus limiting their wide applicability and usage. Conventional IR marks cannot be implemented in an image path. That is, the IR mark itself may still be considered conventional, but as will be discussed in greater detail herein, the embodiments can augment the conventional image path to offer unconventional, unique, and improved capabilities related to IR marking.

What is needed to address the above problems is an image path that can deliver IR mark related functions as part of the image processing system for a multi-function printer (MFP). Conventional IR marks are implemented as part of printing job creation process upstream of (the image path or image processing system of) the MFP. Therefore, there is no IR marking capability available, for example, for copying. Also, the scan processing part of the MFP, which is used for scan, copy and fax, has not been designed to handle IR marks.

In current implementations, conventional IR marks may be implemented as part of the print job creation process upstream of the MFPs. Thus, for example, it may not be possible to add IR marks to copy jobs. Furthermore, detection of such IR marks when copying or scanning documents containing such IR marks is not possible in current implementations.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, an aspect of the embodiments to provide for improved image processing systems, methods, and devices.

It is another aspect of the embodiments to provide improved security features such as watermarks including infrared marks.

It is a further aspect of the embodiments to provide for improved specialty imaging techniques and devices.

It is also an aspect of the embodiments to provide an improved image path for an image processing apparatus (e.g., a printing system such as an MFP).

It is yet another aspect of the embodiments to provide an image path that effectively and efficiently integrates infrared mark related functions with regular imaging processing functions of an image processing apparatus.

The aforementioned aspects and other objectives and advantages can now be achieved as described herein. In an embodiment, a method of rendering an infrared mark, can involve providing an image path for an image processing apparatus, wherein the image path integrates infrared mark related functions with regular image processing functions of the image processing apparatus, and rendering the infrared red mark with the image processing apparatus, after subjecting the infrared mark to the infrared mark related functions in the image path of the image processing apparatus.

In an embodiment, the infrared mark related functions can further involve detecting the existence and the location of the infrared mark.

In an embodiment, the infrared mark related functions can further involve detecting information embedded in the infrared mark.

In an embodiment, the detection of the information embedded in the infrared mark can be performed in L*a*b* space prior to applying other image processing functions of the image processing apparatus.

In an embodiment, the infrared mark related functions can further involve subjecting the infrared mark to infrared mark blanking.

In an embodiment, the image path can comprise one or more of: a front-end image path and a middle function.

In an embodiment, an image processing apparatus for rendering an infrared mark, can include at least one memory that stores a program, and at least one processor that executes the program to perform: providing an image path for the image processing apparatus, wherein the image path integrates infrared mark related functions with regular image processing functions of the image processing apparatus, and rendering the infrared red mark with the image processing apparatus, after subjecting the infrared mark to the infrared mark related functions in the image path of the image processing apparatus.

In an embodiment, a non-transitory computer-readable storage medium can store a program for causing a processor to execute a method of rendering an infrared mark, the method comprising: providing an image path for an image processing apparatus, the image path comprising at least one of: a front-end image path and a middle function, wherein the image path integrates infrared mark related functions with regular image processing functions of the image processing apparatus, and rendering the infrared red mark with the image processing apparatus, after subjecting the infrared mark to the infrared mark related functions in the image path of the image processing apparatus.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the principles of the embodiments.

DETAILED DESCRIPTION

Figure 1:
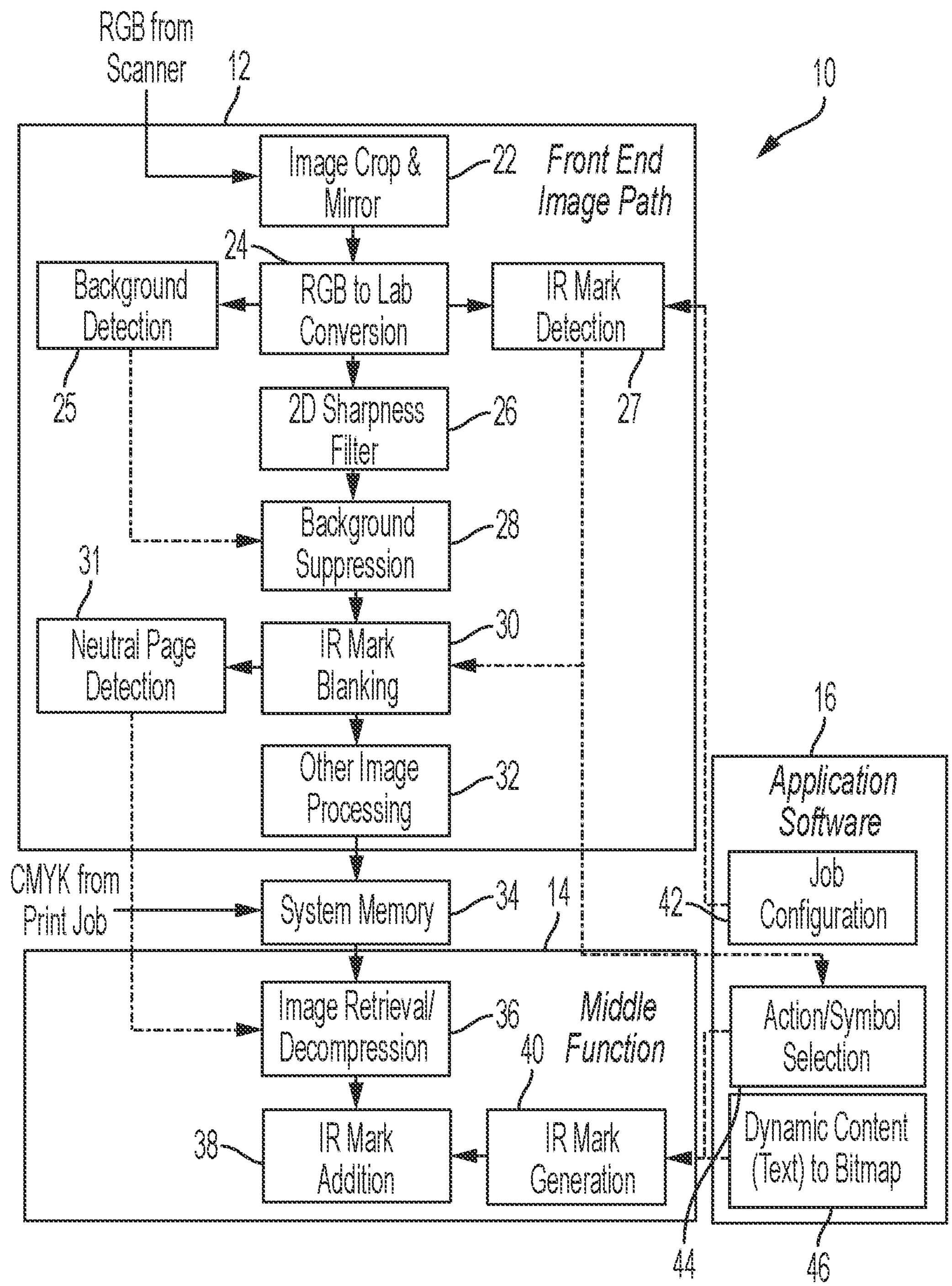
FIG. 1 illustrates a system level image path diagram for a printing/copying/scanning system with IR mark imaging capability, in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The term "data" as utilized herein can relate to physical signals that can indicate or include information. The term "image" as utilized herein can relate to a pattern of physical light or a collection of data representing the physical light, and may include characters, words, and text as well as other features such as graphics.

An example of "data" includes "image data" which can comprise a number of pixels. Each pixel can correspond to a defined location in the image. Image data can include various color or gray levels. Each pixel of an image can be assigned a number representing the amount of light or gray level for that space or that particular spot, i.e., the shade of gray in the pixel. Binary image data has two possible values for each pixel, black or white, which are represented by a 1-bit value (1 for back, 0 for white). Image data may be defined in terms of a color space using values such as RGB (red, green, blue) or CMYK (cyan, magenta, yellow, black) or luminance and chrominance channels such as YCbCr or L*a*b. Images that have a large range of shades of grays are referred to as grayscale images.

When image data is provided by an image input device or terminal (IIT), such as a scanner, it may be received and/or processed to input binary or contone image data. When scanning, printing or copying image data, the image data often goes through a number of image processing operations such as, but not restricted to, scaling, color space conversion, filtering, rasterization (i.e., converting image data in vector graphics format or shapes into pixels for output on a printer), and/or a number of image manipulation operations, such as middle function operations (rotating, merging, annotating, etc.) for output The term "digital image" as utilized herein can be by extension an image represented by a collection of digital data. An image may be divided into "segments," each of which is itself an image. A segment of an image may be of any size up to and including the whole image.

The term "image object" or "object" as used herein is believed to be considered in the art generally equivalent to the term "segment" and can be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An operation can perform "image processing" when it operates on an item of data that relates to part of an image.

A digital color printing system is an apparatus arrangement suited to accepting image data and rendering that image data upon a substrate, such as, for example, a recording medium.

The term 'infrared' (also referred to sometimes as 'infrared light') can relate to electromagnetic radiation with wavelengths longer than those of visible light. It is therefore invisible to the human eye. IR is generally understood to encompass wavelengths from the nominal red edge of the visible spectrum around 700 nanometers, to 1 millimeter.

The "RGB color model" is an additive color model in which red, green, and blue can be added together in various ways to reproduce a broad array of colors. The name of the model comes from the initials of the three additive primary colors, red, green, and blue.

One purpose of the RGB color model is for the sensing, representation, and display of images in electronic systems. RGB is a device-dependent color model: different devices detect or reproduce a given RGB value differently, since the color elements and their response to the individual R, G, and B levels vary from manufacturer to manufacturer, or even in the same device over time. Thus, an RGB value does not define the same color across devices without some kind of color management.

The "CMYK color model" is a subtractive color model, which can be used in color printing, and can also be used to describe the printing process itself. CMYK refers to the four inks used in some color printing: cyan, magenta, yellow, and black.

"Colorant" can refer to one of the fundamental subtractive C, M, Y, K, primaries, which may be realized in formulation as, liquid ink, solid ink, dye, or electrostatographic toner. A "colorant mixture" is a particular combination of C, M, Y, K colorants.

The term 'LAB' as utilized refer can relate to the CIELAB color space (also referred to as L*a*b*), which is a color space defined by the International Commission on Illumination in 1976. It expresses color as three values: L* for perceptual lightness, and a* and b* for the four unique colors of human vision: red, green, blue, and yellow. The term 'LAB' can be utilized interchangeably with L*a*b*.

An "infrared mark" (also referred to herein as an "IR mark") is a watermark embedded in the image that has the property of being relatively indecipherable under normal light, and yet decipherable under infrared illumination by appropriate infrared sensing devices, such as infrared cameras.

The word "printer" and the term "printing/copying/scanning system" as used herein can encompass any apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a print engine, and which may perform a print outputting function for any purpose. A digital color printing system is an example of a printer or printing system. Both a printer and a printing/copying/scanning system are examples of an image processing apparatus.

FIG. 1 illustrates a system level diagram of an image path 10 with IR mark imaging capability for a printing/copying/scanning system, in accordance with an embodiment. The image path 10 shown in FIG. 1 can involve the use of various functions and/or modules for detecting the existence and location of IR marks as well as the information embedded in the IR mark. Note that each block shown in FIG. 1 may be implemented as a module, element, circuit or feature for achieving a particular operation, such as, for example, image processing operations including imaging cropping and mirroring, background detection, RGB to LAB conversion, and so on.

An image cropping and mirror module 22 can be located in a front-end image path 12. In the example shown in FIG. 1, the front-end image path may be, for example, a series of image processing operations that generate an image ready for copying/scanning/faxing or ready for storing in memory for further processing through, for example, middle functions 14 and other additional operations such as, for example, a digital-front end (DFE) image path.

Note that "DFE" for many may be associated with the "front end" for printing systems, while here "front end" can refer to the part of the system that can process the scanned image before placing it in memory for page or job storage. The term "middle function" can relate to part of the system that can retrieve an image from memory, perform some additional processing, and store it back to the memory. A complete system may include a "backend" part as described in, for example, U.S. Pat. No. 8,130,389, entitled "Cost Effective Image Path for Multiple Office Applications," which issued to Li et al. on Mar. 6, 2012, and is assigned to Xerox Corporation. U.S. Pat. No. 8,130,389 is incorporated herein by reference in its entirety.

The "backend" may perform some processing as the image is being sent from memory to the marking engine. (It is not necessary for use with the embodiments as at it is not affected by IR marking]. Therefore the 'image path' can include the front-end image path 12 and a middle function 14 shown in FIG. 1.

The image cropping and mirror module 22 can receive image data such as RGB data from a scanner (e.g., see "RGB from Scanner" and arrow pointing to the image and cropping mirror block 22). Data (e.g., image data) output from the image cropping and mirror module 22 can be fed as input to an RGB to L*a*b* conversion module 24, which then outputs data, which can be input to a background detection module 25, an IR mark detection module 27 and a two-dimension (2D) sharpness filter 26. Data output from the 2D sharpness filter 26 can be fed at input to a background suppression module 28. Note that data processed by the background detection 25 can also be fed as input to the background suppression module 28.

Note that a non-limiting example of a 2D filter that can be utilized to implement the 2D sharpness filter 26 in an embodiment is disclosed in U.S. Pat. No. 9,763,333 entitled "Filter Configuration for Software Based Image Path,"

which issued to Li et al. on Aug. 15, 2027 and is assigned to the Xerox Corporation. U.S. Pat. No. 9,763,333 is incorporated herein by reference in its entirety.

The background suppression module 28 can then output data (e.g., image data) that can be fed as input to an IR mark blanking module 30. Note that data output by the IR detection module 27 may also be input the IR mark blanking module 30, which in turn can output data that can be fed as input to an image processing module 32 (i.e., "other image processing") and a neutral page detection module 31. The IR mark blanking module 30 can provide an IR mark blanking function.

Data output from the image processing module 32 can be provided as input to a memory 34 (e.g., system memory). Note that CMYK data from a print job or a copy job may be stored in the memory 34. Data contained in the memory 34 can be provided as input to an image retrieval/decompression module 36. Note that data can also be output from the neutral page detection module 31 and input to the image retrieval/decompression module 32.

Data output from the image retrieval/decompression module 36 can be provided as input to an IR mark addition module 38. In addition, data from an IR mark generation module 40 can be supplied as input to the IR mark addition module 38. Note that the image retrieval/decompression module 36, the IR mark additional module 38, and the IR mark generation mark module 40 can from the middle function 14 shown in FIG. 1.

Note that the application software 16 can include a job configuration module 42, an action/symbol selection module 44, and a dynamic context (Text) to bitmap module 46. Data output from the action/symbol selection module 44 and the dynamic context (Text) to bitmap module 46 can be provided as input to the IR mark generation module 40 of the middle function. The job configuration module 42 of the application software 16 can output data that can be input to the IR mark detection module 27, which in turn can output data that can be provided as input to the action/symbol selection module 44.

As depicted in FIG. 1, detection can be performed in the L*a*b* space before other image processing functions can be applied. The detection can be configured by the application software 16 and the detection result can be passed to the application software 16 to control IR mark updating and other actions.

The IR mark blanking function provided by the IR mark blanking module 30 can white out the area where the original IR mark was placed. In an embodiment, when an IR mark is detected via the IR mark detection module 27, one of the actions to take can involve replacing the original IR with a new one, to maintain the quality of the mark that can continue to serve as a deterrence and also to update the dynamic information embedded in the IR mark for tracking.

The IR blanking function provided by the IR mark blanking module 30 can ensure that the original IR mark is removed if the new/updated IR mark is placed at a different location. It can be applied after background detection provided by the background detection module 25 and background adjustment therefore will not impact these functions. In this implementation the IR mark blanking function can be applied before implementation of neutral page detection implemented by the neutral page detection module 31 so that the color pixels in the IR mark are not counted in the neutral page detection. The blanking operation provided by the IR mark blanking module 30 can be performed based on the results reported from the IR mark detection function implemented by the IR mark detection module 27.

The "Other Image Processing" functionality provided by the imaging processing module 32 can involve existing functions such as scaling, TRC, saturation adjustment, L*a*b* to CMYK conversion, etc.

The application of the IR mark can be accomplished in the middle function 14 of the image path. Note that the overall image path can include the front-end image path 12 and the middle function 14. The middle function 14 is where traditional functions such as image rotation, image merge, annotation, etc. can be performed. In an embodiment, the information to be embedded in the IR mark in the format of bitmaps can be received from the application software 16.

The bitmaps can be pre-stored as in the case of graphical symbols and the application software 17 can point to the symbol to be used based on a user selection. The bitmaps can also be dynamically converted from text entered by the user and/or generated by the device (e.g., a printing/copying/scanning system or printing apparatus), similar to the existing annotation feature. The IR mark generation function provided by the IR mark generation module 40 in the middle function 14 can embed the bitmaps in the IR mark to be added to the CMYK output. The resolution and bit depth of the IR mark generated can be dynamically determined based on job attributes. The IR mark addition function provided by the IR mark addition module 38 can reuse the image merge function. Having the IR mark generation and IR mark addition functions in the middle function 14 can allow the device to efficiently handle both copy job and print jobs as well as color and black and white jobs.

The proposed image path indicated by image path 12 and the middle function 14 not only provides a way to apply an IR mark in the device for both copy and print jobs but can also enable new features centered around IR mark detection for all service types including copying and scanning services.

FIG. 1 thus illustrates an image path architecture that can support device-based IR mark imaging. The image path depicted in FIG. 1 including the front-end image path 12 and the middle function 14 can effectively integrate IR mark related functions with the regular image processing functions of an image processing apparatus such as an MFP, which is an example of a printing/copying/scanning system. The approach shown in FIG. 1 not only provides an efficient way to apply an IR mark in the device (e.g., a printing/copying/scanning system) for both copy and print jobs but can also enable new features centered around IR mark detection.

Note that in some embodiments, the IR mark detection module 27 can be fused with the background detection module 25, and the IR mark blanking module 30 can be fused with a background adjustment module (not shown in FIG. 1). Doing so can potentially improve computation and memory efficiency. In addition, if the original infrared mark is located on non-white paper and the intention is to keep the original background color, then the background detection module 25 can report the paper color detected for the IR mark blanking module 30 to use.

Figure 2:
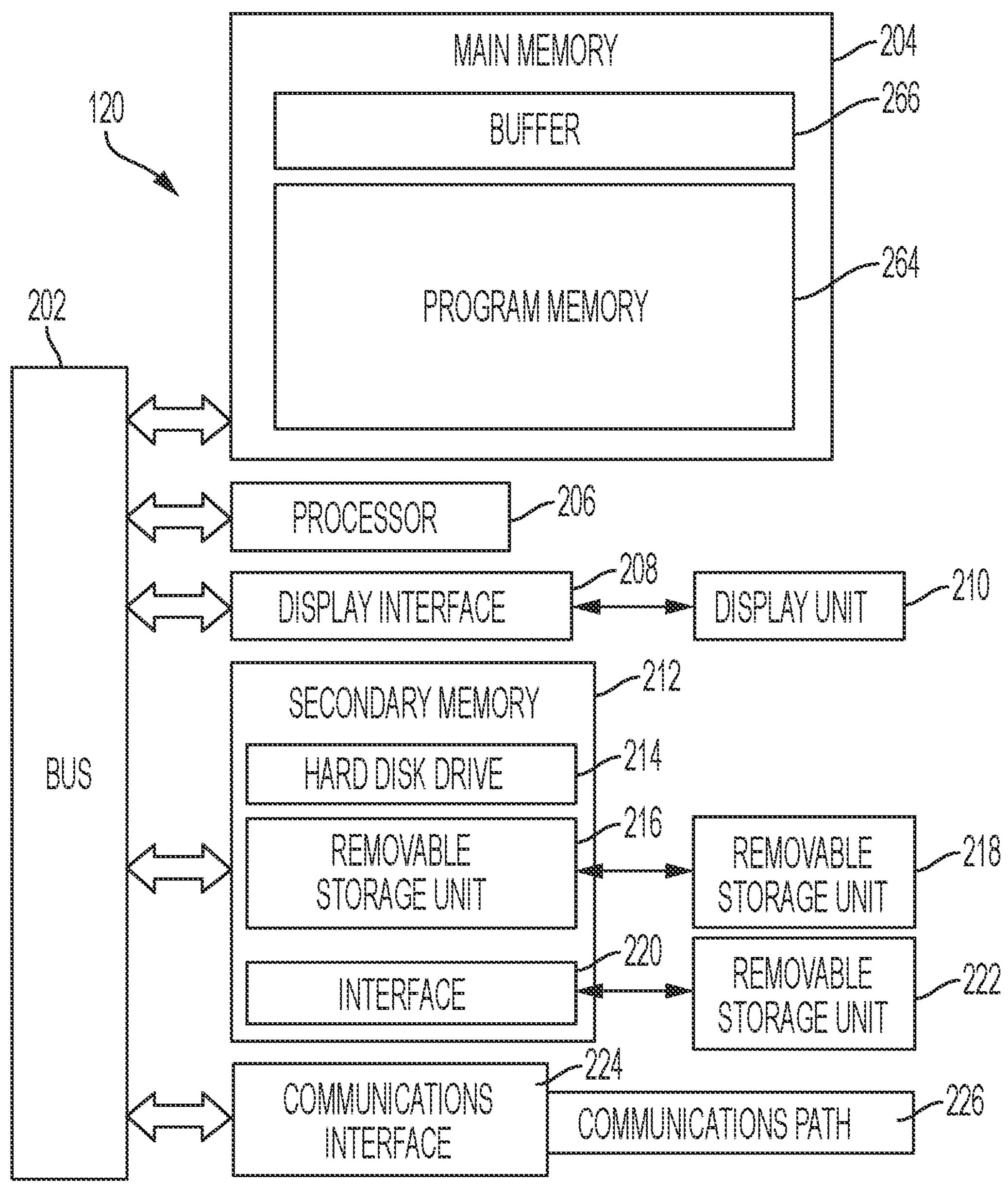
FIG. 2 illustrates a block diagram of a digital front-end controller of a printing system suitable for implementing one or more aspects of the exemplary methods described herein.

FIG. 2 illustrates a block diagram of a digital front-end (DFE) controller 120 useful for implementing one or more aspects of the embodiments. With respect to FIG. 2, an exemplary DFE controller 120 is shown in greater detail. The DFE controller 120 can form part of a DFE. The image path discussed above with respect to FIG. 1 including both the front-end image path 12 and the middle function 14 can be implemented via the DFE controller 120 shown in FIG. 2.

The DFE controller 120 can include one or more processors, such as processor 206 capable of executing machine executable program instructions. Note that the term digital front-end (DFE) as utilized herein can relate to a workflow touchpoint that can accept a print file (e.g., a pdf or PostScript file) and can turn the print file into a format that a print engine (e.g., toner or inkjet) can use to lay down the content on a substrate (e.g., print media, etc.). In an embodiment, a DFE can be a raster image processor (RIP) but may include much more depending on the type of device/system in which the DFE is implemented. A DFE controller thus can comprise a device, program, and/or system for controlling the DFE of a printing system or image processing apparatus, such as, for example, the printing system 100 shown in FIG. 3.

In the embodiment shown in FIG. 2, the processor 206 can communicate with a bus 202 (e.g., a backplane interface bus, cross-over bar, or data network, etc.). The DFE controller 120 also can include a main memory 204 that can store machine-readable instructions. Note that the system memory 34 shown in FIG. 1 may include or can be implemented as the main memory 204 depicted in FIG. 2.

The main memory 204 can store data and can alternatively include random access memory (RAM) to support reprogramming and flexible data storage. A buffer 266 can be used to temporarily store data for access by the processor. The main memory 204 can also include a program memory 264 that can comprise, for example, executable programs that can implement one or more of the embodiments of the methods described herein. The program memory 264 can store at least a subset of the data contained in the buffer 266.

The DFE controller 120 can include a display interface 208 that can forward data from the communication bus 202 (or from a frame buffer not shown) to a display 210. The DFE controller 120 also can comprise a secondary memory 212, which may include, for example, a hard disk drive 214 and/or a removable storage drive 216, which can read and write data to removable storage 218, such as a floppy disk, magnetic tape, optical disk, etc., that can store computer software and/or data.

The secondary memory 212 alternatively can include other similar mechanisms for allowing computer programs or other instructions to be loaded into the computer system. Such mechanisms can include, for example, a removable storage unit 222 adapted to exchange data through an interface 220. Examples of such mechanisms include a program cartridge and cartridge interface (such as that found in video game devices), a removable memory chip (such as an EPROM or PROM) and associated socket, and other removable units and interfaces, which allow software and data to be transferred.

Note that in some embodiments, the system memory 34 shown in FIG. 1 can include or may be the second memory 212. That is, the system memory 34 can include the main memory 204 and/or the secondary memory 212. DFE controller 120 can include a communications interface 224, which can act as both input and output to allow software and data to be transferred between the digital front-end controller 120 and external devices. Examples of a communications interface include a modem, a network interface (such as an Ethernet card), a communications port, a PCMCIA slot and card, etc.

Computer programs (also called computer control logic) may be stored in main memory 204 and/or secondary memory 212. Computer programs may also be received via a communications interface 224, which is associated with a communications path 226. Such computer programs, when executed, can enable the computer system to perform the features and capabilities provided herein such as, for example, the instructions, operations, or steps shown at blocks 32 to 40 in FIG. 11 and described elsewhere herein. Software and data transferred via the communications interface can be in the form of signals which may be, for example, electronic, electromagnetic, optical, or other signals capable of being received by a communications interface.

These signals can be provided to the communications interface 224 via the communications path 226 (i.e., channel), which can carry signals and may be implemented using wire, cable, fiber optic, phone line, cellular link, RF, or other communications channels. Part of the data generally stored in secondary memory 212 for access during digital front-end operation can be a set of translation tables that can convert an incoming color signal into a physical machine signal. This color signal can be expressed either as a colorimetric value, usually three components as L*a*b*, RGB, XYZ, etc., into physical exposure signals for the four toners cyan, magenta, yellow, and black. These tables can be created outside of the digital front-end and downloaded and may be optionally created within the DFE in a so-called characterization.

Figure 3:
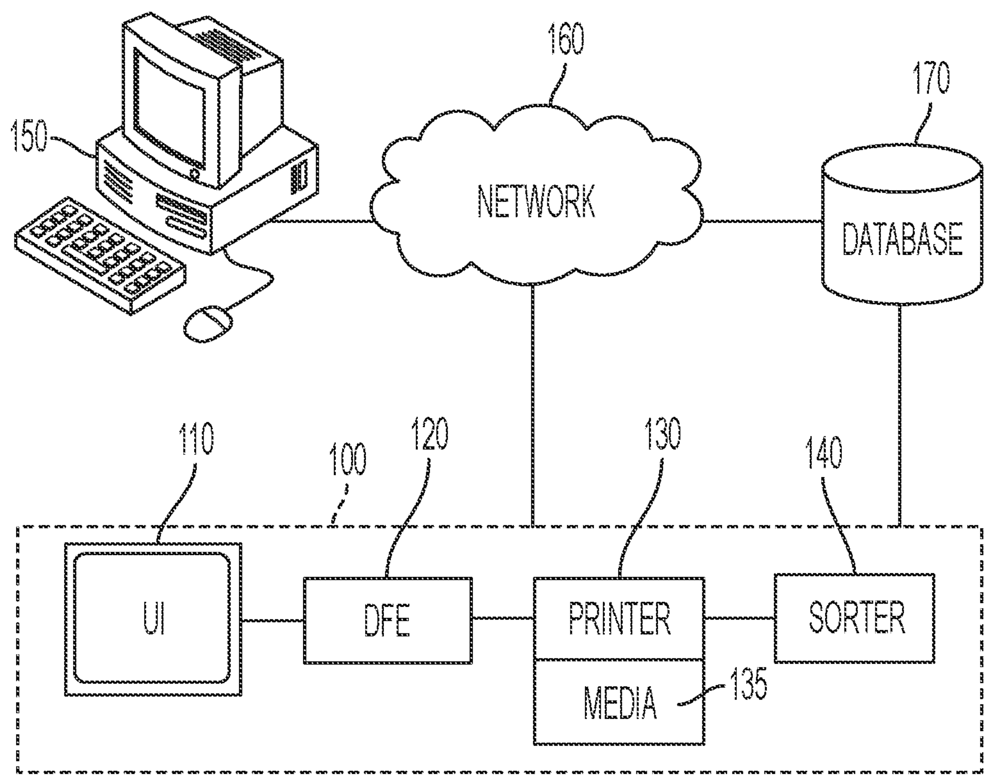
FIG. 3 illustrates a block diagram of digital front-end controller useful for implementing one or more aspects of the exemplary methods described herein.

FIG. 3 illustrates a block diagram of a printing system (or image rendering system) 100, which can be suitable for implementing various aspects of the exemplary embodiments described herein. The front-end image path 12 and the middle function 14, for example, can be implemented in the printing system 100 shown in FIG. 3. The printing system 100 depicted in FIG. 3 is an example of an MFP or image processing apparatus.

The printing system 100 is an imaging processing apparatus or printing/copying/scanning system that can include a user interface 110 and the DFE controller 120. A print engine that can access the print media 135 (e.g., substrate(s)) of various sizes and/or costs) for a print job. The user interface 110 can communicate bidirectionally with the DFE controller 120, which in turn can communicate bidirectionally with the print engine 130. The printing system 100 can also include a sorter 140 that can communicate bidirectionally with the print engine 130.

It should be appreciated that the printing system 100 and its various components and features as described herein is not to be considered a limiting feature of the embodiments, but merely represents an example of a printing/copying/scanning system that can be adapted for use with one or more embodiments. It can be appreciated that other types of printing/copying/scanning systems may be implemented and used in place of the printing system 100.

Note that as utilized herein, the word "printer" and the term "printing/copying/scanning system" can encompass any apparatus and/or system, such as a digital copier, image processing apparatus, xerographic and reprographic printing systems, bookmaking machine, facsimile machine, multifunction machine, ink-jet machine, continuous feed, sheet-fed printing device, etc., which may contain a print controller and a print engine, and which may perform a print outputting function for any purpose.

In an embodiment, the sorter 140 can operate after or with the print engine 130 to manage arrangement of the hard copy output, including cutting functions, facilitating printing/rendering of a job (e.g., a print job or a copy job). A user can access and operate the printing system 100 using the user interface 110 or via a data-processing apparatus. The data-processing apparatus can communicate with the printing system 100 via a data network 160 (e.g., a packet-based bidirectional wireless communications network, etc.). Note the term 'print job' as used herein can relate to a set of related sheets, usually one or more collated sets that represents prints of an electronic document page images, from a particular user, or otherwise related.

A user profile, a work product for printing, a media library, and various print job parameters can be stored in a database or memory 170 accessible by the data-processing apparatus or the printing system 100 via the data network 160, or such data can be directly accessed via the printing system 100. One or more color sensors (not shown) may be embedded in the printer paper path, as known in the art.

The claims, description, and drawings of this application may describe one or more of the instant technologies in operational/functional language, for example, as a set of operations to be performed by a computer. Such operational/functional description in most instances can be specifically-configured hardware (e.g., because a general purpose computer in effect becomes a special-purpose computer once it is programmed to perform particular functions pursuant to instructions from program software).

Note that the data-processing systems and devices discussed herein may be implemented as a general purpose computer or a special-purpose computer in some embodiments. That is, data-processing systems can be programmed to perform the aforementioned particular instructions thereby becoming in effect a special-purpose computer. In some situations, a printing device or printing system may be a special-purpose computer. Thus, the DFE controller 120 shown in FIG. 2 may be implemented in some embodiments as a special purpose computer or with a special purpose computer. Similarly, in other embodiments, the DFE controller 120 shown in FIG. 3 may be implemented as a special-purpose computer or in association with a special-purpose controller.

The foregoing description including system level image path diagrams and block diagrams are provided merely as illustrative examples and are not intended to require or imply that the steps of the various embodiments must be performed in the order presented. As will be appreciated by one of skill in the art the order of the operations, blocks, steps, elements and features in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that may be specific to a given function.

In one or more exemplary aspects, the functions described can be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

While various embodiments have been described above, it should be understood that they have been presented by way of example only, and not of limitation. The breadth and scope should not be limited by any of the above-described example embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components can be described or claimed in the singular, the plural is contemplated to be within the scope thereof unless limitation to the singular is explicitly stated. The presence of broadening words and phrases such as “one or more,” “at least,” “but not limited to” or other like phrases in some instances shall not be read to mean that the narrower case is intended or required in instances where such broadening phrases can be absent.

While various embodiments have been described above, it is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words “module,” “mechanism,” “element,” “device,” and the like may not be a substitute for the word “means.” As such, no claim element is to be construed as a means plus function unless the element is expressly recited using the phrase “means for.”

Furthermore, the functionalities including operations, steps, blocks, features, elements and instructions described herein may be implemented entirely and non-abstractly as physical hardware, entirely as physical non-abstract software (including firmware, resident software, micro-code, etc.) or combining non-abstract software and hardware implementations that may all generally be referred to herein as a “circuit,” “module,” “engine”, “component,” “block”, “database”, “agent” or “system.” Furthermore, aspects of the embodiments may take the form of a computer program product embodied in one or more non-ephemeral computer readable media having computer readable and/or executable program code embodied thereon. The application software 16 shown in FIG. 1, for example, may be implemented by various modules, circuits, and so on. Examples of such modules, circuits, etc. including the modules 42, 44, and 46 and so on as depicted in FIG. 1.

Although not required, the disclosed embodiments can be described in the general context of computer-executable instructions, such as program modules, being executed by a single computer. In most instances, a “module” (also referred to as an “engine”) may constitute a software application but can also be implemented as both software and hardware (i.e., a combination of software and hardware).

Generally, modules implemented as program modules may include, but are not limited to, routines, subroutines, software applications, programs, objects, components, data structures, etc., that can perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can refer to a collection of routines and data structures, which can perform a particular task or can implement a particular data type. A module can be composed of two parts: an interface, which lists the constants, data types, variable, and routines that can be accessed by other modules or routines, and an implementation, which is typically private (accessible only to that module), and which includes source code that actually implements the routines in the module. The term module may also simply refer to an application, such as a computer program designed to assist in the performance of a specific task, such as word processing, accounting, inventory management, etc.

In some example embodiments, the term “module” can also refer to a modular hardware component or a component that can be a combination of hardware and software. It should be appreciated that implementation and processing of the disclosed modules, whether primarily software-based and/or hardware-based or a combination thereof, according to the approach described herein can lead to improvements in processing speed and ultimately in energy savings and efficiencies in a data-processing system such as, for example, the printing system 100 and DFE controller 120.

Based on the foregoing, it can be appreciated that a number of embodiments are disclosed herein. For example, in an embodiment a method of rendering an infrared mark, can involve providing an image path for an image processing apparatus, wherein the image path integrates infrared mark related functions with regular image processing functions of the image processing apparatus, and rendering the infrared red mark with the image processing apparatus, after subjecting the infrared mark to the infrared mark related functions in the image path of the image processing apparatus.

In an embodiment, the infrared mark related functions can further involve detecting the existence and the location of the infrared mark.

In an embodiment, the infrared mark related functions can further involve detecting information embedded in the infrared mark.

In an embodiment, the detection of the information embedded in the infrared mark can be performed in L*a*b* space prior to applying other image processing functions of the image processing apparatus.

In an embodiment, the infrared mark related functions can further involve subjecting the infrared mark to infrared mark blanking.

In an embodiment, the image path can comprise one or more of: a front-end image path and a middle function.

In an embodiment, an image processing apparatus for rendering an infrared mark, can include at least one memory that stores a program, and at least one processor that executes the program to perform: providing an image path for the image processing apparatus, wherein the image path integrates infrared mark related functions with regular image processing functions of the image processing apparatus, and rendering the infrared red mark with the image processing apparatus, after subjecting the infrared mark to the infrared mark related functions in the image path of the image processing apparatus.

In an embodiment, a non-transitory computer-readable storage medium can store a program for causing a processor to execute a method of rendering an infrared mark, the method comprising: providing an image path for an image processing apparatus, the image path comprising at least one of: a front-end image path and a middle function, wherein the image path integrates infrared mark related functions with regular image processing functions of the image processing apparatus, and rendering the infrared red mark with the image processing apparatus, after subjecting the infrared mark to the infrared mark related functions in the image path of the image processing apparatus.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method of rendering an infrared mark, comprising:

providing an image path for an image processing apparatus, wherein the image path integrates infrared mark related functions with regular image processing functions of the image processing apparatus, the infrared mark related functions comprising detecting information embedded in the infrared mark; and rendering the infrared mark with the image processing apparatus, after subjecting the infrared mark to the infrared mark related functions in the image path of the image processing apparatus.

2. The method of claim 1 wherein the infrared mark related functions further comprise:

detecting an existence and a location of the infrared mark.

3. The method of claim 1 wherein the infrared mark related functions further comprise:

detecting a location of the infrared mark.

4. The method of claim 1 wherein the infrared mark related functions further comprise:

detecting an existence of the infrared mark.

5. The method of claim 1 wherein the detection of the information embedded in the infrared mark is performed in L*a*b* space prior to applying other image processing functions of the image processing apparatus.

6. The method of claim 1 wherein the infrared mark related functions further comprise:

subjecting the infrared mark to infrared mark blanking.

7. The method of claim 1 wherein the image path comprises a front-end image path.

8. The method of claim 1 wherein the image page comprises a middle function.

9. The method of claim 1 wherein the image path comprises at least one of: a front-end image path and a middle function.

10. An image processing apparatus for rendering an infrared mark, comprising:

at least one memory that stores a program; and at least one processor that executes the program to perform:

providing an image path for the image processing apparatus, wherein the image path integrates infrared mark related functions with regular image processing functions of the image processing apparatus, the infrared mark related functions comprising detecting information embedded in the infrared mark; and rendering the infrared mark with the image processing apparatus, after subjecting the infrared mark to the infrared mark related functions in the image path of the image processing apparatus.

11. The image processing apparatus of claim 10 wherein the infrared mark related functions further comprise:

detecting an existence and a location of the infrared mark.

12. The image processing apparatus of claim 10 wherein the infrared mark related functions further comprise:

detecting an existence of in the infrared mark.

13. The image processing apparatus of claim 10 wherein the infrared mark related functions further comprise:

detecting a location of the infrared mark.

14. The image processing apparatus of claim 10 wherein the detection of the information embedded in the infrared mark is performed in L*a*b* space prior to applying other image processing functions of the image processing apparatus.

15. The image processing apparatus of claim 10 wherein the infrared mark related functions further comprise:

subjecting the infrared mark to infrared mark blanking.

16. The image processing apparatus of claim 10 wherein the image path comprises a front-end image path.

17. The image processing apparatus of claim 10 wherein the image page comprises a middle function.

18. The image processing apparatus of claim 10 wherein the image path comprises at least one of: a front-end image path and a middle function.

19. A non-transitory computer-readable storage medium storing a program for causing a processor to execute a method of rendering an infrared mark, the method comprising:

providing an image path for an image processing apparatus, the image path comprising at least one of: a front-end image path and a middle function, wherein the image path integrates infrared mark related functions with regular image processing functions of the image processing apparatus; and rendering the infrared mark with the image processing apparatus, after subjecting the infrared mark to the infrared mark related functions in the image path of the image processing apparatus, the infrared mark related functions comprising detecting an existence and a location of the infrared mark.

20. The non-transitory computer-readable storage medium of claim 19 wherein:

the infrared mark related functions further comprise:

detecting information embedded in the infrared mark; and the detection of the information embedded in the infrared mark is performed in L*a*b* space prior to applying other image processing functions of the image processing apparatus.

* * * * *